United States Patent Office 3,235,294
Patented Feb. 15, 1966

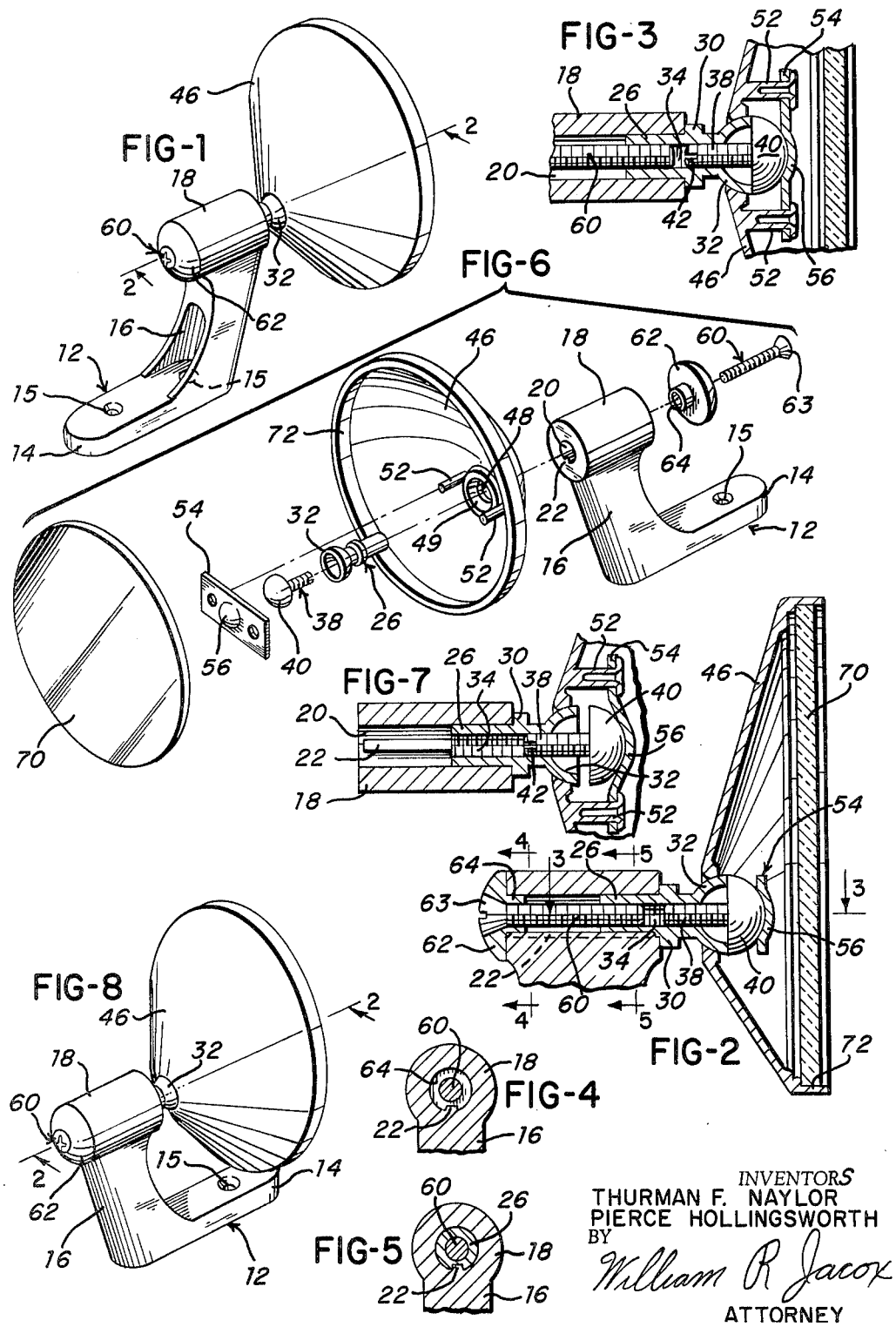

3,235,294
REAR VIEW MIRROR UNIT
Thurman F. Naylor, Wellesley, and Pierce Hollingsworth, Wayland, Mass., assignors to Standard-Thomson Corporation, Waltham, Mass., a corporation of Delaware
Filed Jan. 21, 1963, Ser. No. 252,789
8 Claims. (Cl. 287—21)

This invention relates to a rear view mirror unit. The invention relates particularly to a reversible base rear view mirror unit.

An object of this invention is the provision of a rear view mirror unit in which a base member thereof can be reversed with respect to the other members of the unit.

Another object of this invention is to provide a rear view mirror unit in which the elements of the unit can be assembled in two different configurations.

Another object of this invention is to provide such a mirror unit in which the base thereof can be reversed without altering the mounting position thereof.

Another object of this invention is to provide a mirror unit in which the members which retain the pivotal position of the mirror housing with respect to the base are relatively adjustable so that the forces retaining the pivotal position of the mirror housing with respect to the base can be changed.

Other objects and advantages reside in the construction of parts, the combination thereof, the method of manufacture, and the mode of operation, as will become more apparent from the following description.

In the drawing:

FIGURE 1 is a perspective view of a rear view mirror unit of this invention.

FIGURE 2 is an enlarged sectional view taken substantially on line 2—2 of FIGURE 1. FIGURE 2 is also an enlarged sectional view taken substantially on line 2—2 of FIGURE 8.

FIGURE 3 is an enlarged sectional view taken substantially on line 3—3 of FIGURE 2.

FIGURE 4 is a sectional view taken substantially on line 4—4 of FIGURE 2.

FIGURE 5 is a sectional view taken substantially on line 5—5 of FIGURE 2.

FIGURE 6 is a perspective exploded view of the elements of the unit as shown in FIGURE 1, with the unit turned substantially 180 degrees from the position thereof shown in FIGURE 1.

FIGURE 7 is an anlarged fragmentary view of most of the elements as shown in FIGURE 3 and with the elements in an adjusted position.

FIGURE 8 is a perspective view of the unit of FIGURE 1 with the base thereof shown in a position reversed from that of FIGURE 1.

Referring to the drawing in detail, a rear view mirror unit of this invention comprises a base 12 provided with a pedestal 14 which is particularly adapted to be attached to a door, or fender, or other portion of an automobile or the like. Preferably, the pedestal 14 has a shape in which portions thereof which engage an attachment surface have opposed areas which are symmetrical or similar in shape. Any suitable means may be used for such attachment of the pedestal 14 to a surface. For example, mounting holes 15 may be used for insertion of mounting screws, bolts, or the like. Preferably, the mounting holes 15 are symmetrically located in the pedestal 14.

Joined to the pedestal 14 and preferably integral therewith is any suitable extension portion 16. Carried by the extension portion 16 is a connection portion 18 which is provided with a bore 20 therethrough which is open at both ends thereof. Within the bore 20 is an elongate comparatively small protuberance 22 shown in FIGURES 4, 5, and 7, which, preferably, extends substantially the length of the bore 20.

A stem 26 snugly slidably fits into either end of the bore 20. The stem 26 is provided with a slot which is adapted to receive a portion of the protuberance 22 to prevent rotation of the stem 26 within the bore 20. The stem 26 has a collar 30 which engages the connection portion 18 at the end of the bore 20 and determines the position of the stem 26 within the bore 20.

The stem 26 has an arcuate or semispherical end 32 which may be hollow, as shown, if desired. The stem 26 has a threaded passage 34 which preferably, extends therethrough.

A screw 38 having an arcuate or semispherical head 40 is threaded into the passage 34 of the stem 26. By rotative threaded movement of the screw 38 the head 40 of the screw 38 is movable to a position adjacent the semispherical end 32 of the stem 26, as shown in FIGURES 2 and 3. However, by rotative threaded movement of the threaded screw 38, the head 40 is moved with respect to the semispherical end 32 of the stem 26. The head 40 may be spaced from the portion 32 in the manner shown in FIGURE 7. The screw 38 has a slot 42 at the end thereof opposite the head 40 for insertion of a screwdriver blade for rotative movement of the screw 38. When the head 40 is in juxtaposed relationship with the end 32, the semispherical end 32 of the stem 26 and the semispherical head 40 of the screw 38 form a substantially spherical member as shown in FIGURES 2 and 3. As the head 40 is movable with respect to the end portion 32, the head 40 serves as an extendable end of the stem 26. Thus, the arcuate end 32 of the stem 26 serves as a fixed extension portion thereof and the arcuate head 40 of the screw 38 serves as an adjustable extension portion of the stem 26.

A mirror housing 46 has an opening 48, shown in FIGURE 6, within which the semispherical end 32 of the stem 26 is disposed. Encompassing the opening 48 within the housing 46 is an arcuate seat 49.

Within the housing 46 and integral therewith is a pair of pins 52 which rigidly support a pressure plate 54. The plate 54 is attached to the pins 52 in any suitable manner. The plate 54 has a socket portion or depression 56. The pressure plate 54 has a limited degree of resiliency. The substantially spherical member formed by the semispherical end 32 of the stem 26 and the semispherical head 40 of the screw 38 is disposed between the arcuate seat 49 which encompasses the opening 48 and the seat formed by the socket portion 56 of the pressure plate 54. Thus, the housing 46 is resiliently pivotally supported upon the stem 26.

Means are provided to adjust the pressure of the head 40 upon the pressure plate 54. When the elements are assembled in the manner shown in FIGURE 7 or when the stem is removed from the connection portion 18, the screw 38 may be threadedly adjusted in its position within the passage 34. A screwdriver may be inserted into the passage 34 and into engagement with the slotted end 42 of the screw 38 for rotatively adjustably moving the screw 38 within the threaded passage 34 of the stem 26. The screw 38 is rotated to move the head 40 thereof in a direction from the semispherical portion 32 of the stem 26. By this method any desired pressure is applied upon the pressure plate 54 and upon the arcuate seat 49. Thus, any desired forces are provided to retain the pivotal adjustment of the housing 46 with respect to the stem 26.

In order to secure the stem 26 in its proper position within the bore 20, an attachment screw 60 extends into the bore 20 from the end opposite the stem 26 and is threadedly inserted into the passage 34 of the stem 26. The attachment screw 60 extends through a cap 62. The cap 62 is engaged by a head 63 of the screw 60. The cap 62 engagegs the end of the connection portion 18.

The cap 62 is shown as having a portion 64 within the bore 20. Thus, the stem 26 is secured by the screw 60 within the bore 20.

A mirror 70 is secured by adhesive means or by any other suitable means to the housing 46 within a flange portion 72 thereof.

Due to the fact that the bore 20 is open at both ends thereof, the stem 26 can be disposed at either end of the bore 20, with the cap 62 at the opposite end of the bore 20. Therefore, if desired, the base 12 may be reversed from its position shown in FIGURE 1 to its position shown in FIGURE 8 while the mirror 70 faces in the same direction. As stated above, the mounting holes 15 are preferably symmetrically positioned so that the location of the pedestal 14 upon any surface to which it is attached is the same when the base 12 is positioned as shown in FIGURE 1 or as shown in FIGURE 8.

Thus, the owner of a mirror unit of this invention can assemble the unit into either one of two different configurations. Furthermore, either configuration can be attached to the same surface area.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. A reversible base mirror comprising:
a base, the base having a connection portion provided with a bore therethrough open at opposite ends thereof;
a stem having a portion positionable within the bore at either end thereof,
the stem having a semispherical end,
the stem having a threaded passage therein,
an adjustment screw threadedly positioned within the threaded passage, the adjustment screw having a semispherical head which is in alignment with and engageable with the semispherical end of the stem, the semispherical head also being movable in spaced relation from the the semispherical end of the stem,
a connection screw extending into the bore at the end thereof opposite the stem, the connection screw also extending into the stem so that the stem is secured to the connection portion of the base,
a mirror housing, the mirror housing having an opening therein provided with an arcuate peripheral seat,
a plate within the housing and secured thereto adjacent said opening,
the semispherical head of the adjustment screw being in engagement with the plate while the semispherical end of the stem is in engagement with said arcuate seat, the housing thus being adjustably rotatably carried by the stem and by the adjustment screw.

2. A rear view mirror unit particularly adapted for use with an automobile, comprising:
a base having a connection portion,
the connection portion being provided with a bore therethrough open at opposite ends thereof,
a stem having a portion slidably fitting within the bore, the stem also having a collar engageable with the connection portion at the end of the bore.
the stem having a substantially semispherical end portion spaced from the connection portion,
the stem having a threaded hole therein,
an adjustment screw provided with a substantially semispherical head, the screw being threadedly connected within the threaded hole of the stem, the head of the screw having substantially the same radius as the semispherical end of the stem,
the adjustment screw being adjustably movable to position the head thereof in juxtaposition with the semispherical end of the stem to form a substantially complete sphere at the end of the stem, the adjusting screw being adjustably movable with respect to the stem to position the head of the adjustment screw in spaced relation from the semispherical end portion of the stem,
a cap covering the bore of the connection portion at the end of the bore opposite the stem,
a connection screw having a portion engaging the cap, the connection screw extending through the cap and into the threaded hole of the stem and securing the stem with respect to the connection portion of the base,
a mirror housing adjustably rotatably supported by the semispherical end of the stem and by the semispherical end of said adjustment screw.

3. A mirror assembly comprising:
a base provided with a bore therethrough,
a stem within the bore and having an extension portion spaced from the base,
the extension portion of the stem having a substantially semispherical end,
a connection member adjustably attached to the stem and having a substantially semispherical portion which is movable to juxtaposition with the semispherical end of the extension portion of the stem so that a substantially spherical body is formed, the semispherical portion of the connection member also being movable to positions spaced from the semispherical end of the extension portion,
support means provided with opposed arcuate surfaces which are engaged by the semispherical end of the extension portion of the stem and by the semispherical portion of the connection member,
the support means thus being carried by the stem with the angular position of the support means with respect to the stem being adjustable,
the pressure applied to the opposed arcuate surfaces being determined by the adjusted position of the semispherical portion of the connection member with respect to the semispherical end of the extension portion of the stem,
the force retaining the adjusted position of the support means with respect to the stem thus being adjustable.

4. In a mirror assembly,
a base provided with a bore therethrough,
a stem having a part positionable within the bore at either end thereof,
means limiting the position of the stem within the bore,
attachment means carried by the stem at the end thereof,
a mirror housing carried by said attachment means,
connection means at the end of the bore opposite the stem, the connection means extending into the bore and connected to the stem and securing the stem with respect to the base,
the attachment means including a substantially semispherical end member fixedly carried by the stem and a substantially semispherical end member adjustably carried by the stem and movable with respect to the semispherical end member, the semispherical member which is adjustably carried by the stem being movable into engagement with the fixedly carried end member to form a substantially spherical body.

5. A mirror assembly comprising:
a base provided with a bore therethrough open at opposite ends thereof,
a stem within the bore and having an extension portion spaced from one end of the bore,
the extension portion of the stem having a substantially semispherical end, a connection member adjustably attached to the stem and having a substantially semispherical portion which is movable to a position adjacent the semispherical end of the extension portion of the stem so that a substantially spherical body is formed the semispherical portion of the connection member also being movable to positions spaced from the semispherical end of the extension portion, mirror support means provided with opposed arcuate surfaces which are engaged by the semispherical end of the extension portion of the stem and by the semispherical portion of the connection member so that the mirror support means is adjustably carried by the stem and by the connection member, the pressure applied to said opposed arcuate surfaces being determined by the adjusted position of the semispherical portion of the connection member with respect to the semispherical end of the extension portion of the stem, the force retaining the adjusted position of the mirror support means with respect to the stem thus being adjustable, means abutting the base at the end of the bore opposite the stem and extending into the bore and attached to the stem securing the stem with respect to the base.

6. A mirror unit comprising:

a base provided with a bore therethrough open at opposite ends thereof, the bore having the same shape and the same dimensions at each of the opposite ends thereof, a stem having an attachment portion slidably disposible within the bore at either end thereof, the stem having an arcuate extension portion exterior of the bore, the arcuate extension portion of the stem being a portion of a sphere, connection means abutting the base at the end of the bore opposite the stem, the connection means having a portion within the bore and joined to the attachment portion of the stem, a support member carried by the attachment portion of the stem and adjustably movable toward and away from the attachment portion of the stem, said support member having an arcuate portion which is a portion of a sphere, the arcuate portion of said support member forming an opposed arcuate portion from the arcuate extension portion of the stem, a mirror housing having a pair of opposed arcuate surfaces, one of the arcuate surfaces being engaged by the arcuate portion of said support member and the other arcuate surface being engaged by the arcuate extension portion of the stem, the pressure applied to the opposed arcuate surfaces being adjusted by the adjusted position of the arcuate portion of the support member with respect to the arcuate extension portion of the stem.

7. Support structure comprising:

a base provided with a connection portion, a stem carried by the connection portion, support means having a pair of spaced-apart surfaces, connection means carried by the stem and in engagement with the spaced-apart surfaces for supporting the support means, the connection means including adjustable abutment means which are adjustable to change the engagement forces between the connection means and the spaced-apart surfaces of the support means, the connection means including two substantially semispherical members which are relatively adjustably movable to juxtaposition and which are relatively adjustably movable to spaced-apart positions.

8. A reversible base mirror unit comprising:

a base provided with a connection portion, the connection portion having a bore therethrough open at opposite end portions thereof, each of the opposite end portions of the bore having the same shape and the same dimensions, a stem within the bore at one end thereof, the stem being slidably movable into the bore at either end thereof, the stem having a fixed extension portion, the stem having an attachment portion which is adjustably movable toward and away from the extension portion, the fixed extension portion and the attachment portion providing opposed spaced-apart surfaces, a mirror housing carried by the attachment portion and by the extension portion of the stem and having opposed abutment portions in engagement with the spaced-apart surfaces provided by the fixed extension portion and by the attachment portion, attachment means abutting the connection portion of the base at the end of the bore opposite the stem, the attachment means being connected to the stem and retaining the stem with respect to the base.

References Cited by the Examiner

UNITED STATES PATENTS

| | | | |
|---|---|---|---|
| 823,594 | 6/1906 | Frazee | 287—21 |
| 938,219 | 10/1909 | Crumb | 287—21 X |
| 1,689,750 | 10/1930 | Redfield | 287—12 |
| 2,089,463 | 8/1937 | Ritz-Woller | 287—21 |
| 2,385,421 | 9/1945 | Monroe | 285—263 X |
| 2,457,639 | 12/1948 | Brooks | 287—23 |
| 2,726,575 | 12/1955 | Koonter | 88—98 |
| 2,964,746 | 12/1960 | Trudnak et al. | 88—93 |

CARL W. TOMLIN, *Primary Examiner.*